United States Patent [19]

Watanabe et al.

[11] Patent Number: 4,697,224
[45] Date of Patent: Sep. 29, 1987

[54] ELECTRIC DOUBLE LAYER CAPACITOR

[75] Inventors: Koichi Watanabe; Michinobu Maesaka, both of Nagaokakyo, Japan

[73] Assignee: Murata Manufacturing Co., Ltd., Japan

[21] Appl. No.: 922,278

[22] Filed: Oct. 23, 1986

[30] Foreign Application Priority Data

Nov. 1, 1985 [JP] Japan ................................ 60-245347

[51] Int. Cl.$^4$ ............................................. H01G 9/02
[52] U.S. Cl. .................................................... 361/433
[58] Field of Search .................................... 361/433 M

[56] References Cited

U.S. PATENT DOCUMENTS 3,656,027  4/1972  Isley ..................................... 361/433
4,023,079  5/1977  Selover et al. ....................... 361/433
4,605,989  8/1986  Marse et al. ......................... 361/433
4,626,964  12/1986 Azuma et al. ........................ 361/433

FOREIGN PATENT DOCUMENTS 60-9337  3/1985  Japan .

Primary Examiner—Donald A. Griffin
Attorney, Agent, or Firm—Ostrolenk, Faber, Gerb & Soffen

[57] ABSTRACT

An electric double layer capacitor which comprises a separator of electrically insulative material having ion permeability and polarizable electrodes of solid carbonaceous material being opposite to each other through the separator, which are sealed in a case. The separator and at least one of the polarizable electrodes are adhered or stuck to each other by adhesive or cohesive layers partially in a region in which the said polarizable electrode faces the separator.

13 Claims, 10 Drawing Figures

ELECTRIC DOUBLE LAYER CAPACITOR

BACKGROUND OF THE INVENTION

1. Field of the Invention

The present invention relates to an electric double layer capacitor with improved structure for receiving a separator and polarizable electrodes.

2. Description of the Related Art

Japanese Patent Publication No. 9337/1985 discloses a prior art electric double layer capacitor 1 having the structure as shown in FIG. 9. The electric double layer capacitor 1 comprises a gasket 2 of insulating rubber and a separator 3 and polarizable electrodes 4 and 5 received in an opening 2a of the gasket 2. The polarizable electrodes 4 and 5 are made of solid carbonacenous material, and arranged to be opposite to each other on both sides of the separator 3. The separator 3 is made of electrically insulative material having ion permeability.

The separator 3 and the polarizable electrodes 4 and 5 are impregnated with an electrolyte such as 30% sulfuric acid and received in the opening 2a of the gasket 2, to which collecting electrodes 6 and 7 are adhered by a rubber-system, epoxy-system or hot melting-system adhesive agent to seal the opening 2a.

As hereinabove described, the polarizable electrodes 4 and 5 are opposite to each other on opposite side of the separator 3 and sealed in the opening 2a by the collecting electrodes 6 and 7. Therefore, the polarizable electrodes 4 and 5 are liable to be displaced in the opening 2a and may, for example, come into contact with one peripheral edge of the opening 2a as shown in FIG. 10. If a clearance or gap exists between the separator 3 and the peripheral edge of the opening 2a, the polarizable electrodes 4 and 5, which must be separated from each other, may come into contact with each other as shown in FIG. 10 to cause shorting. Such shorting occurs at a rate of about 30% in the manufacturing process of conventional electric double layer capacitors 1, resulting in extremely inferior production yield.

Even if no such shorting is observed in the inspection process upon manufacturing, the polarizable electrodes 4 and 5 may be displaced in transportation or in use to cause shorting. Thus, awaited is an electric double layer capacitor or higher reliability.

SUMMARY OF THE INVENTION

Accordingly, it is an object of the present invention to provide an electric double layer capacitor which can substantially prevent shorting between polarizable electrodes.

According to the present invention there is provided an electric double layer capacitor which comprises an electrically insulative separator, which is an ion-permeable member, and a pair of polarizable electrodes of solid carbonacenous material opposite to each other on opposite sides of the separator and sealed to the same. A central feature of the electric double layer capacitor according to the present invention resides in that the separator and at least one of the polarizable electrodes are adhered or stuck to each other by an adhesive or cohesive agent in part of a region in which the polarizable electrode faces the separator.

In the present invention, the expression "solid carbonaceous material" means material containing carbon, which can be handled as a solid body.

Such material can be prepared from carbonaceous compact of mixture of a carbonaceous powder and a caking agent, obtained by (a) mixing carbonaceneous powder such as activated carbon, graphite or carbon black with glass frit, molding and heating the mixture to melt the glass frit and cooling and hardening the same, (b) mixing the carbonaceneous powder, tar or pitch with a binder and a solvent and molding the mixture, or (c) mixing activated carbon with a binder such as chlorosulfonated polyethylene dispersion, polyvinyl alcohol, polyvinyl pyrolidone or the like and molding the mixture.

The solid carbonaceous material employed in the present invention is not restricted to the aforementioned compact, but can be prepared from woven or nonwoven fabric of carbon fiber.

Further, the solid carbonacenous material may be one wherein carbon powders are supported on metal foil or the like.

According to an aspect of the present invention, the separator and at least one of the polarizable electrodes are adhered or stuck to each other in part of a region in which the polarizable electrode faces the separator.

Thus, at least one of the polarizable electrodes is fixed with respect to the separator, whereby the polarizable electrode is not displaced in manufacturing and transportation. Therefore, the polarizable electrodes can be prevented from shorting caused by displacement thereof. Thus, the invention provides an electric double layer capacitor improved in yield and excellent in reliability.

These and other objects, features, aspects and advantages of the present invention will become more apparent from the following detailed description of embodiments of the present invention when taken in conjunction with the accompanying drawings.

BRIEF DESCRIPTION OF THE DRAWINGS

FIGS. 2 and 3 illustrate steps for obtaining the electric double layer capacitor as shown in FIG. 1, in which FIG. 2 is a sectional view showing a step of cutting a separator and FIG. 3 is a sectional view showing a step in which polarizable eldctrodes are stuck to both sides of the separator;

DESCRIPTION OF THE PREFERRED EMBODIMENTS

Figure 1:
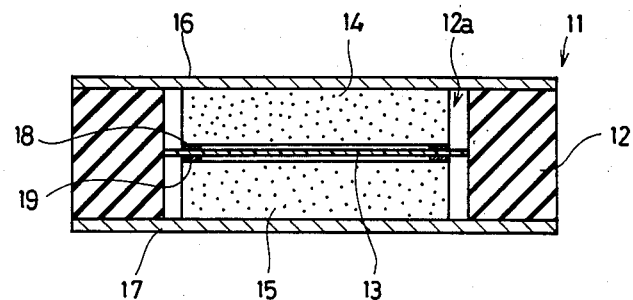
FIG. 1 is a sectional view showing an electric double layer capacitor according to an embodiment of the present invention.

FIG. 1 shows an electric double layer capacitor 11 according to a first embodiment of the present invention. The electric double layer capacitor 11 comprises a gasket 12 of insulating rubber, which receives a separator 13 and polarizable electrodes 14 and 15 in its opening 12a. Similarly to the conventional electric double layer capacitor 1 (see FIG. 9), the opening 12a is sealed by collecting electrodes 16 and 17, which are adhered to both sides of the gasket 12.

Figure 2:
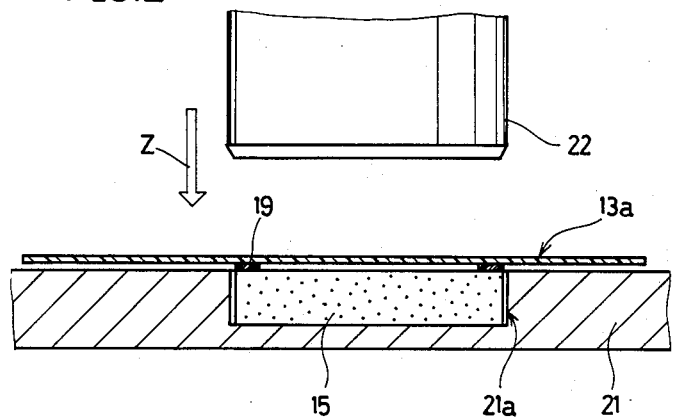

According to this embodiment, the polarizable electrodes 14 and 16 are stuck to the separator 13 by cohesive layers 18 and 19 respectively. The cohesive layers 18 and 19 are applied to parts of regions in which the polarizable electrodes 14 and 15 face the separator 13. If the cohesive layers 18 and 19 were applied entirely over the surfaces of the separator 13, the separator 13 will be blinded or blocked and thereby lose ion permeability. According to the present invention, therefore, it is mandatorily required that the polarizable electrodes 14 and 15 be adhered or stuck to the separator 13 only in parts or portions of the regions in which the same face the separator 13. An exemplary method of manufacturing the electric double layer capacitor 1 as shown in FIG. 1 will now be described. As shown in FIG. 2, a base 21 having a cavity 21a is prepared to receive one polarizable electrode 15 in the cavity 21a. Then the cohesive layer 19 is formed on part of the upper surface of the polarizable electrode 15, to adhere a separator sheet 13a to the same. Then, an annular cutting edge 22 is downwardly moved from above along an arrow Z direction, to cut the separator sheet 13a. Thus obtained is an assembly in which the separator 13 is stuck to the polarizable electrode 15.

Figure 3:
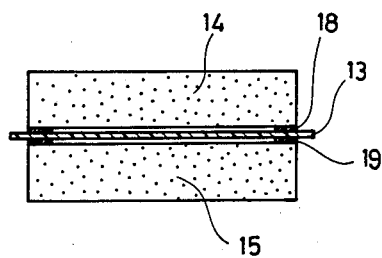

Then the cohesive layer 18 is formed on the upper surface of the separator 13 to stick the other polarizable electrode 14 to the same, as shown in FIG. 3. The separator 13 and the polarizable electrodes 14 and 15 thus obtained can be integrally handled since the polarizable electrodes 14 and 15 can be handled as solid bodies while the same are stuck to the separator 13 respectively. Thus, this assembly can be received as a single member in the opening 12a of the gasket 12 as shown in FIG. 1. Therefore, the electric double layer capacitor 11 can be efficiently assembled.

The polarizable electrodes 14 and 15 may be impregnated with an electrolyte either before assembling or after being received in the opening 12a of the gasket 12. The collecting electrodes 16 and 17 are adhered to both sides of the gasket 12, the opening 12a of which receives the polarizable electrodes 14 and 15 and the separator 13.

Figure 4:
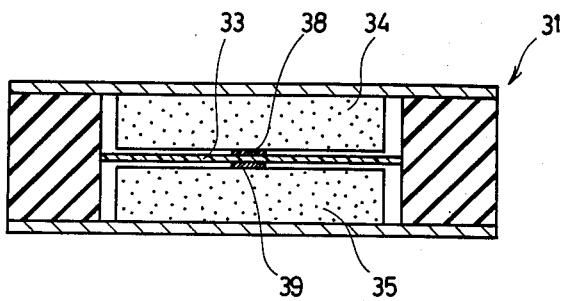
FIG. 4 is a sectional view showing an electric double layer capacitor according to a second embodiment of the present invention.

FIG. 4 is a sectional view showing a second embodiment of the present invention. An electric double layer capacitor 31 according to the second embodiment comprises polarizable electrodes 34 and 35 stuck to a separator 33 at the central portion thereof. Namely, cohesive layers 38 and 39 are applied to both sides of the separator 33 at its central portion to stick the polarizable electrodes 34 and 35 to the separator 33. Other portions of this embodiment are similar to those of the electric double layer capacitor 11 as shown in FIG. 1.

Figure 5:
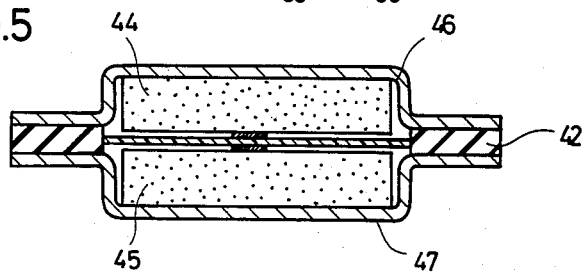
FIG. 5 is a sectional view showing an electric double layer capacitor according to a third embodiment of the present invention.

FIG. 5 shows an electric double layer capacitor according to a third embodiment of the present invention. In the third embodiment, a thin gasket ring 42 is employed in place of the gasket 12 of the electric double layer capacitor 11 as shown in FIG. 1. Therefore, collecting electrodes 46 and 47 are bent along the gasket ring 42 in the exterior of peripheral edges of polarizable electrodes 44 and 45, to be adhered and fixed to the gasket ring 42. Other portions of the third embodiment are similar to those of the electric double layer capacitor 31 as shown in FIG. 4.

Figure 6:
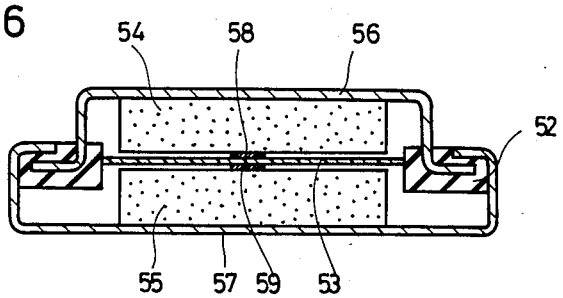
FIG. 6 is a sectional view showing an electric double layer capacitor according to a fourth embodiment of the present invention.

FIG. 6 shows an electric double layer capacitor according to a fourth embodiment of the present invention, which electric double layer capacitor is formed entirely similarly to a thin battery. Namely, cylindrical collecting electrodes 56 and 57 having openings are fixed to a gasket 52 so that the openings thereof are opposite to each other. Polarizable electrodes 54 and 55 and a separator 53 are received in a closed space defined by the collecting electrodes 56 and 57. Also in this embodiment, the polarizable electrodes 54 and 55 are stuck to the separator 53 at the central portion thereof by cohesive layers 58 and 59.

In each of the embodiments as shown in FIGS. 1 to 6, the polarizable electrodes are stuck to the separator with a cohesive agent. This cohesive agent can be arbitrarily prepared by dissolving polyisobutylene in an aromatic organic solvent mainly composed of xylene for example, and the cohesive agent may be applied by an arbitrary method such as screen printing. Further, the cohesive agent may be replaced by an arbitrary adhesive agent such as silicon rubber, to adhere the polarizable electrodes to the separator.

Figure 7:
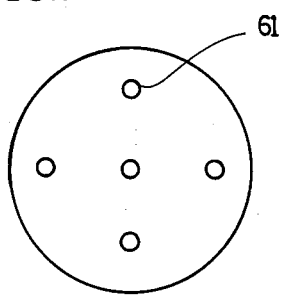
FIGS. 7 and 8 are plan views showing examples of arrangements of adhesive or cohesive layers.
Figure 8:
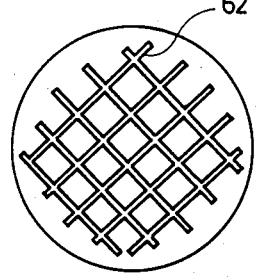

The cohesive or adhesive agent may be applied in any configuration, on condition that the same is applied only to portions of the regions in which the polarizable electrodes face the separator. As shown in FIGS. 7 and 8, uniformly dispersed dot-shaped adhesive layers 61 or net-shaped adhesive layers 62 may be employed.

In each of the embodiments as hereinabove described with reference to FIGS. 1 to 8, both of the polarizable electrodes are stuck or adhered to the separator. However, only one of the polarizable electrodes may be partially adhered or stuck to the separator. If one of the polarizable electrodes is correctly located on the separator to be fixed to the same, both of the polarizable electrodes can be prevented from shorting caused by displacement thereof.

Figure 9:
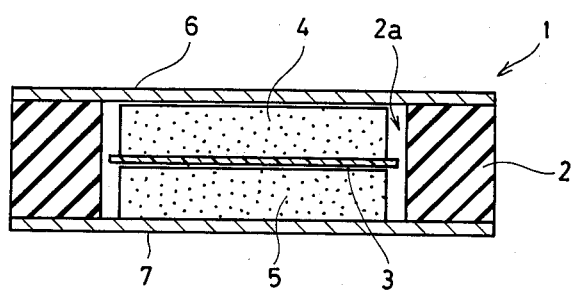
FIG. 9 is a sectional view showing an example of a conventional electric double layer capacitor.
Figure 10:
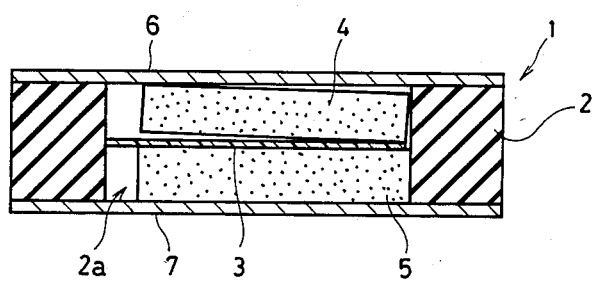
FIG. 10 is a sectional view for illustrating a problem in the conventional electric double layer capacitor as shown in FIG. 9.

According to the present invention, the separator and at least one of the polarizable electrodes are adhered or stuck to each other with the adhesive or cohesive agent in part of a region in which the said polarizable electrode faces the separator. Thus, at least one of the polarizable electrodes is fixed with respect to the separator, whereby no displacement of the said polarizable electrode is caused in manufacturing, transportation and in use. Therefore, the polarizable electrodes can be effectively prevented from shorting caused by displacement thereof. Thus, obtained is an electric double layer capacitor improved in yield and excellent in reliability. According to experiments made by the inventor, defects occurred at a rate of about 30% by the aforementioned shorting in the manufacturing process of the conventional electric double layer capacitors as shown in FIG. 9, while no such defects were observed in the manufacturing process of the electric double layer capacitors according to the present invention as shown in FIGS. 1 and 4.

Although embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:
1. An electric double layer capacitor comprising:

a separator of electrically insulative material having ion permeability;

a pair of polarizable electrodes of solid carbonacenous material which are opposite to each other on opposite sides of said separator;

at least one attaching layer for attaching said separator to a region of at least one of said polarizable electrodes in which said polarizable electrode faces said separator; and a case for sealingly receiving said separator and said polarizable electrodes.

2. An electric double layer capacitor in accordance with claim 1, wherein respective said attaching layers are provided to attach said separator to both of said polarizable electrodes.

3. An electric double layer capacitor in accordance with claim 2, wherein said attaching layers are formed in central regions in which said separator and said polarizable electrodes face each other.

4. An electric double layer capacitor in accordance with claim 2, wherein said attaching layers are formed in outer peripheral regions in which said separator and said polarizable electrodes face each other.

5. An electric double layer capacitor in accordance with claim 1, wherein said case has a gasket having an opening for receiving said separator and said polarizable electrodes in its interior and sealing means attached to said gasket for sealing a space in said opening of said gasket.

6. An electric double layer capacitor in accordance with claim 5, wherein said sealing means includes collecting electrodes.

7. An electric double layer capacitor in accordance with claim 6, wherein said gasket is made relatively smaller in thickness than the combined thickness of said separator and said polarizable electrodes superposed on opposite sides of said separator, so that said polarizable electrodes extend outwardly from said opening of said gasket, said collecting electrodes being provided to cover outer surfaces of said polarizable electrodes and the peripheral edge of said opening of said gasket.

8. An electric double layer capacitor in accordance with claim 7, wherein said separator and said polarizable electrodes are so attached to each other as to form a structural unit.

9. An electric double layer capacitor in accordance with claim 1, wherein a plurality of said attaching layers are formed in a plurality of regions in which said separator and said polarizable electrodes face each other.

10. An electric double layer capacitor in accordance with claim 1, wherein said at least one attaching layer is an adhesive layer.

11. An electric double layer capacitor in accordance with claim 1, wherein said at least one attaching layer is a cohesive layer.

12. An electric double layer capacitor comprising:

a separator of electrically insulative material having ion permeability;

a pair of polarizable electrodes of solid carbonacenous material which are opposite to each other on opposite sides of said separator;

means for attaching said separator to a region of at least one of said polarizable electrodes in which said polarizable electrode faces said separator; and a case for sealingly receiving said separator and said polarizable electrodes.

13. An electric double layer capacitor in accordance with claim 12, wherein said attaching means comprises a layer of attaching material interposed between said separator and said at least one polarizable electrode.

* * * * *